United States Patent
Huang

(10) Patent No.: US 7,213,485 B2
(45) Date of Patent: May 8, 2007

(54) BICYCLE ASSISTIVE HANDLEBAR STRUCTURE

(76) Inventor: Yuan-Hsin Huang, 396, Sec. 2, Yeong Fwu Road, Yung Ching Hsiang, Changhua (TW)

( * ) Notice: Subject to any disclaimer, the term of this patent is extended or adjusted under 35 U.S.C. 154(b) by 3 days.

(21) Appl. No.: 11/099,591

(22) Filed: Apr. 6, 2005

(65) Prior Publication Data

US 2006/0230872 A1  Oct. 19, 2006

(51) Int. Cl.
 *B62K 21/12* (2006.01)
(52) U.S. Cl. .................. 74/551.8; 74/551.1; 74/551.3; 74/551.9; 74/557
(58) Field of Classification Search .............. 74/551.1, 74/551.3, 551.4, 551.6, 551.8, 551.9, 543, 74/544, 551.2, 551.5, 551.7; 280/278, 287, 280/288.4
See application file for complete search history.

(56) References Cited

U.S. PATENT DOCUMENTS

| | | | | |
|---|---|---|---|---|
| 586,897 A * | 7/1897 | Godfrey | ..................... | 74/551.8 |
| 4,750,754 A * | 6/1988 | Lennon | ..................... | 280/261 |
| 5,197,350 A * | 3/1993 | Borromeo | ................... | 74/551.8 |
| 5,241,881 A * | 9/1993 | Chen | ......................... | 74/551.2 |
| 5,353,663 A * | 10/1994 | Samuelson | ................ | 74/551.8 |
| 6,098,493 A * | 8/2000 | Cortes | ....................... | 74/551.8 |
| 6,244,131 B1 * | 6/2001 | Liao | .......................... | 74/551.3 |
| 7,077,029 B2 * | 7/2006 | McColligan et al. | ...... | 74/551.8 |
| 2002/0108465 A1 * | 8/2002 | Rocket | ...................... | 74/551.1 |
| 2005/0000313 A1 * | 1/2005 | Johnson | .................... | 74/551.8 |
| 2005/0044981 A1 * | 3/2005 | Huang | ....................... | 74/551.8 |

* cited by examiner

Primary Examiner—Richard Ridley
Assistant Examiner—Matthew A. Johnson
(74) Attorney, Agent, or Firm—Rabin & Berdo, P.C.

(57) ABSTRACT

A bicycle assistive handlebar structure installed at the anterior extent of a front fork stem, stem clamp mount that serves as a means of conjoinment. The stem clamp mount consists of a concave section and a threaded hole that provides for the fastening of bolts inserted via four through-holes. Furthermore, a vertical coupling passage is disposed through the installation crown, thereby providing for the horizontal arrangement of a handlebar in a connective mounting shank. The two sides of a transverse rod provides for the fitting into position of insertion sleeves, and an elongated hole provides for the stationary seating into the connective mounting shank elongated hole. Radial splines are respectively fabricated along the outer sides of the joint mount and the inner sides of an assistive handlebar. As such, the present invention provides the rider variable adjustment operation over upper and lower height, forward and backward distance, and rotative direction.

1 Claim, 4 Drawing Sheets

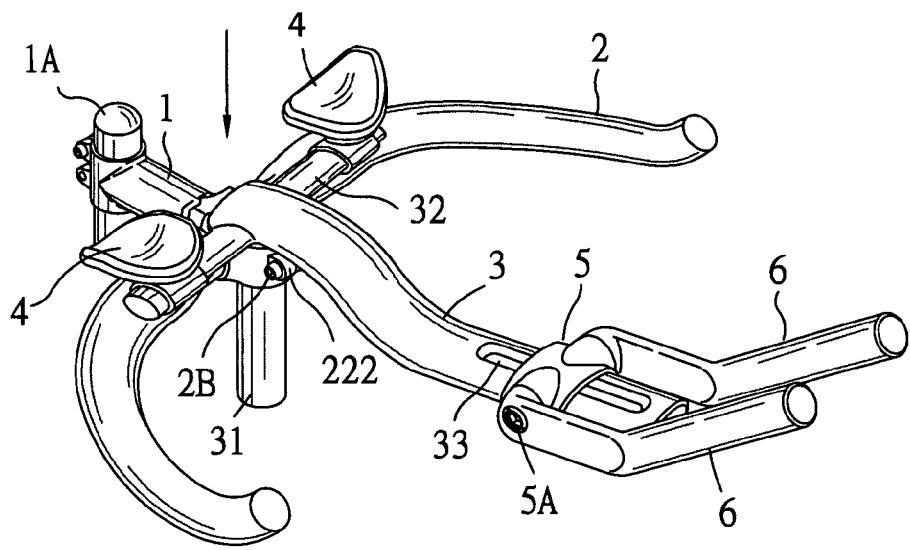
FIG. 2-A
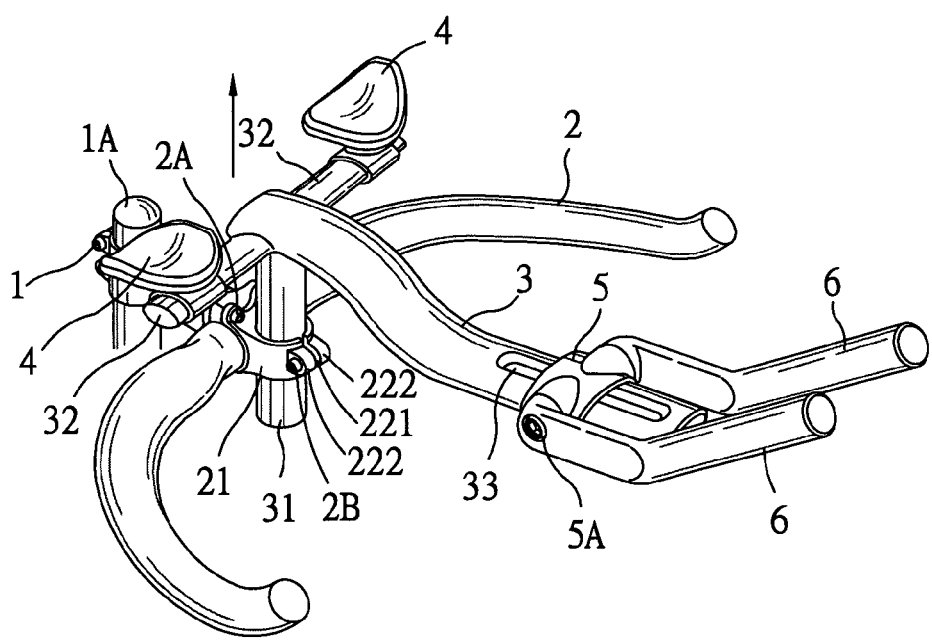
FIG. 2-B

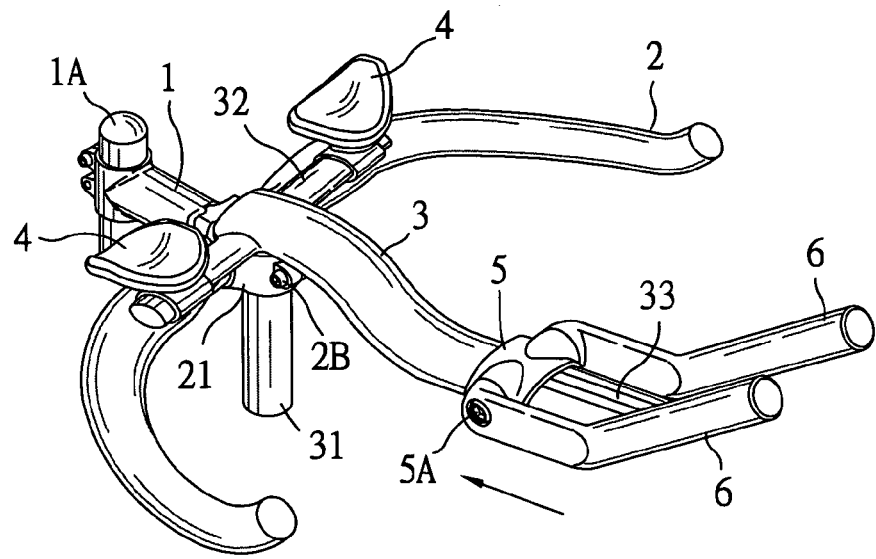
FIG. 3-A
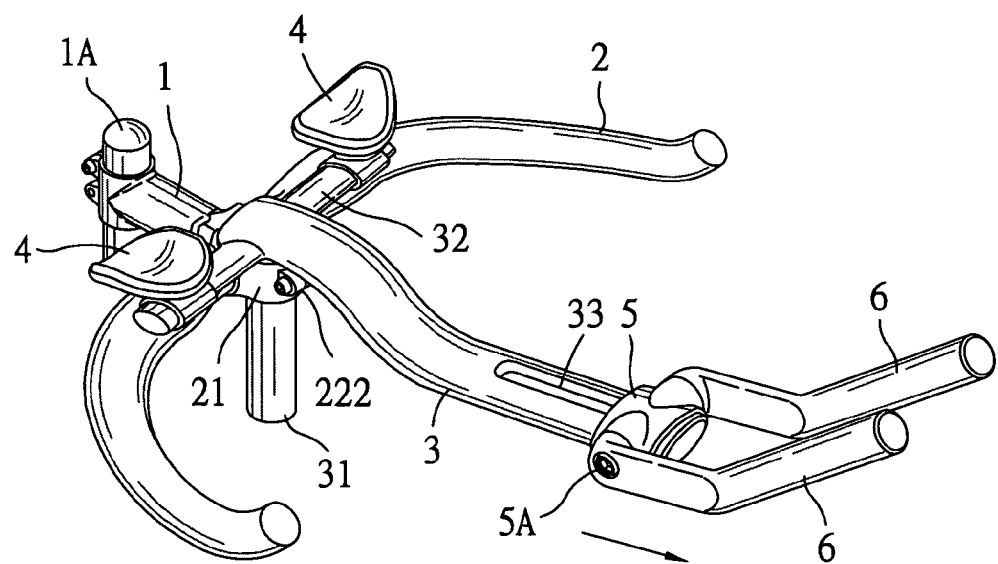
FIG. 3-B

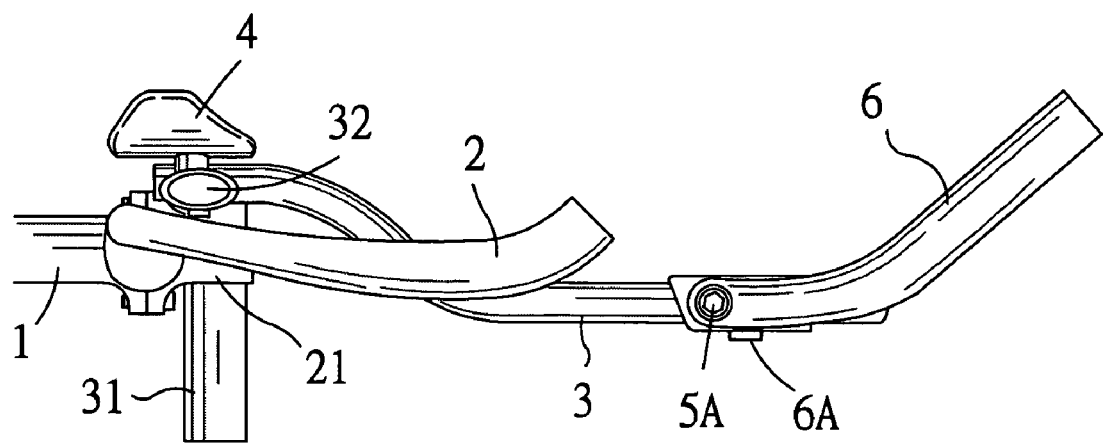
FIG. 4-A
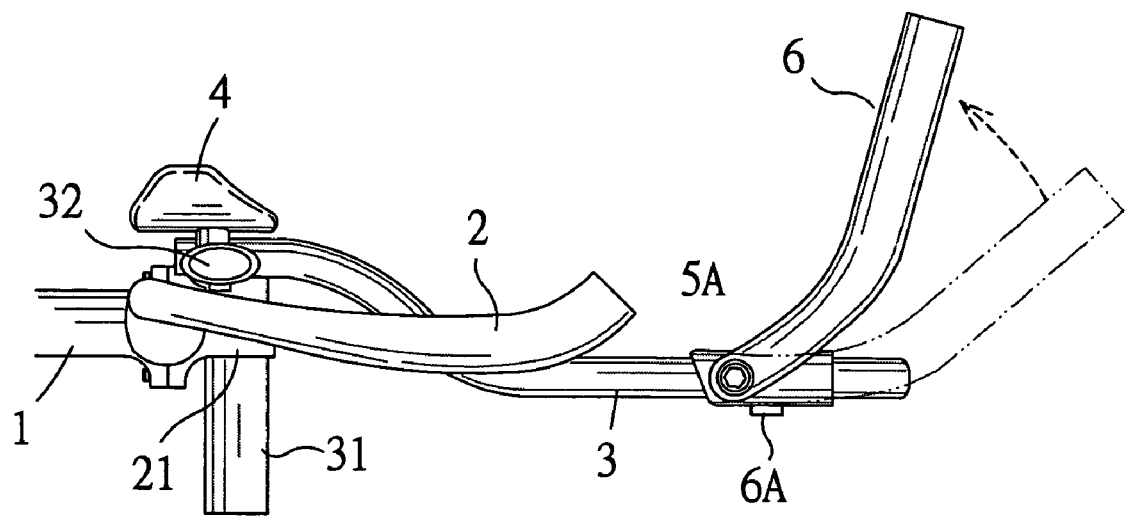
FIG. 4-B

BICYCLE ASSISTIVE HANDLEBAR STRUCTURE

BACKGROUND OF THE INVENTION

1) Field of the Invention

The invention herein relates to a bicycle assistive handlebar structure in which a connective mounting shank of assistive handlebars is installed in the handlebars, with the handlebars then being centrally positioned between an installation crown and a front fork stem, stem clamp mount, enabling the rider variable adjustment operation as needed over upper and lower height, forward and backward distance, and rotative direction to thereby achieve the most suitable grasping posture.

2) Field of the Invention

Conventional bicycle handlebars that accommodate the installation of assistive handlebars are typically designs that enable stationary positioning. However, when another rider mounts such a bicycle and wants to use the permanently positioned assistive handlebars, different riders experience discomfort which not only fails to meet the objective of assistive grasping but also results in manual obstruction and utilization difficulty.

SUMMARY OF THE INVENTION

As a result, the applicant of the invention herein developed the specialized bicycle assistive handlebar structure of the present invention.

The primary objective of the invention herein is to provide a bicycle assistive handlebar structure installed at the anterior extent of a front fork stem, stem clamp mount that serves as a means of conjoinment having an integrated installation crown in which variously shaped handlebars are positioned. The stem clamp mount consists of a concave section and a threaded hole at each of its four corners that provides for the fastening of bolts inserted via four through-holes of an integrated installation crown that is thereby brought into a clamped position. Furthermore, a vertical coupling passage is disposed through the installation crown, thereby providing for the horizontal arrangement of a handlebar in a connective mounting shank after the vertical rod at its lower end is inserted such that the vertical rod of the connective mounting shank in the horizontally arranged handlebar is adjusted up or down to set the height. The two sides of a transverse rod in the connective mounting shank provides for the fitting into position of insertion sleeves at the lower end of a forearm support base and an elongated hole is reticulated at the front end of the connective mounting shank that provides for the stationary seating of a joint mount into the connective mounting shank elongated hole. Radial splines are respectively fabricated along the outer sides of the joint mount and the inner sides of an assistive handlebar and the angle of the assistive handlebars are varied by turning. As such, the rider achieves the most suitable grasping posture.

BRIEF DESCRIPTION OF THE DRAWINGS

FIG. 2-A is an isometric drawing of the connective mounting shank of the invention herein moved downward.

FIG. 2-B is an isometric drawing of the connective mounting shank of the invention herein moved upward.

FIG. 3-A is an isometric drawing of the assistive handlebars of the invention herein moved towards the rear.

FIG. 3-B is an isometric drawing of the assistive handlebars of the invention herein moved towards the front.

FIG. 4-A is an orthographic drawing of the assistive handlebars of the invention herein when stationary.

FIG. 4-B is an orthographic drawing of the assistive handlebar of the invention herein when turned for variation.

DETAILED DESCRIPTION OF THE PREFERRED EMBODIMENTS

Figure 1:
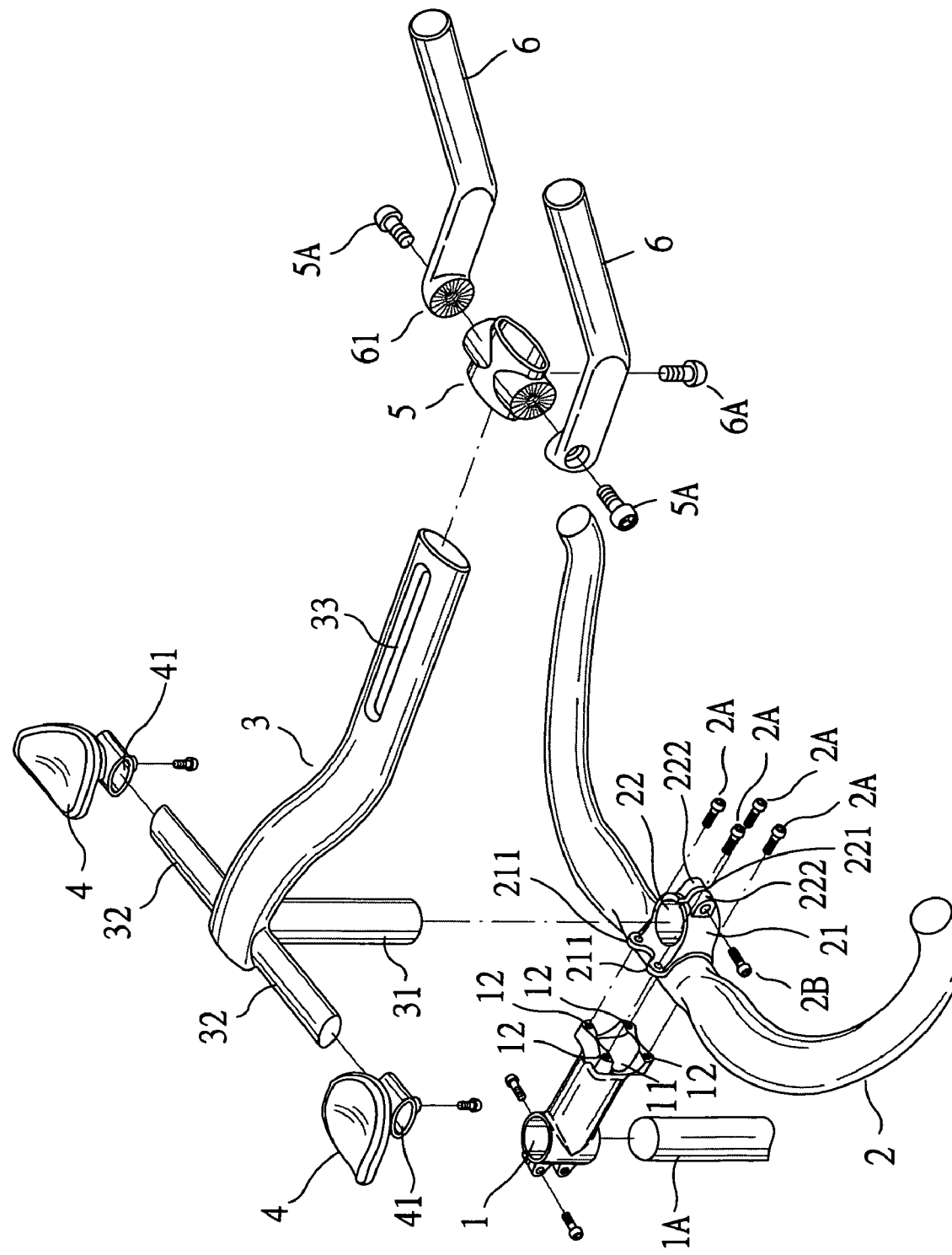
FIG. 1 is an exploded drawing of the invention herein.

Referring to FIG. 1, the bicycle assistive handlebar structure of the invention herein is installed at the anterior extent of a stem clamp mount 1 attached to a front fork stem 1A. The stem clamp mount 1 serves as a means of conjoinment. The stem clamp mount 1 includes a concave section 11 and a threaded hole 12 at each of its four corners that provides for the fastening of bolts 2A inserted via four through-holes 211 of an integrated installation crown 21 to secure variously shaped handlebars 2. Variously shaped handlebars 2 are positioned in the integrated installation crown 21 and, furthermore, a vertical coupling passage 22 is disposed through the installation crown 21. The coupling passage 22 has a breach 221 formed along the one side, with the breach 221 having a perforated lug 222 situated at each of its two sides, thereby providing for the horizontal arrangement of a handlebar 2 in a connective mounting shank 3 after the insertion of its vertical rod 31, following which bolts 2B are inserted through the two perforated lugs 222 and the breach 221 is fastened tightly together. The two sides of a transverse rod 32 in the connective mounting shank 3 of a connective mounting member provides for the fitting into position of insertion sleeves 41 at the lower end of a forearm support base 4 and an elongated hole 33 is reticulated at the front end of the connective mounting shank 3 that provides for the seating of a joint mount 5 into the connective mounting shank 3 elongated hole 33 . Screws 6A are inserted through the elongated hole 33 and fastened into the joint mount 5 to preclude movement. Radial splines 51 and 61 are respectively fabricated along the outer sides of the joint mount 5 and the inner sides of an assistive handlebar 6 and the splines 61 at the inner side of the two assistive handlebars 6 and splines 51 at the outer sides of joint mount 5 are fastened into engagement by a screw 5A.

As such, when the rider wants to use the assistive handlebars 6, the vertical rod 31 of the connective mounting member in the horizontally arranged handlebar 2 is adjusted up or down to set the height (as shown in FIG. 2-A and FIG. 2-B). Since the elongated hole 33 at the front end of the connective mounting shank 3 is utilized to variably move the joint mount 5 that Image Page 3 secures the assistive handlebars 6 forward or backward (as shown in FIG. 3-A and FIG. 3-B), by slightly loosening the screw 5A fastening the joint mount 5 and the assistive handlebars 6 into an originally fixed state (as shown in FIG. 4-A), the assistive handlebars 6 are turned to the desired angle following which they are fixed once again (as shown in FIG. 4-B), thereby providing different riders the most suitable grasping posture during bicycle riding.

In summation of the foregoing section, since the invention herein provides for rapid, convenient, and easy installation as well as optimal grasping, the present invention meets the application requirements stipulated by Article 93 of the new patent law and is submitted to the patent bureau for review and the granting of the commensurate patent rights.

The invention claimed is:

1. A bicycle handlebar structure, comprising:

a stem clamp mount that is attachable to a front fork stem, and including a concave section having four corners, with a threaded hole being provided at each of the four corners;

a handle bar that is received in the concave section;

an installation crown that has four through-holes, each being disposed in alignment with a respective one of the threaded holes, and being fastenable to said stem clamp mount using bolts that are insertable into the respective through-holes and threadably engaged with the respective threaded holes to clamp the handle bar between said installation crown and the concave section of said stem clamp, said installation crown further having a vertical coupling passage having a breach formed along a side thereof, the breach having a perforated lug situated at each of its two sides;

a connective mounting member, having:

a horizontal connective mounting shank having an elongated hole at a front end thereof;

a vertical rod attached to a rear end of said connective mounting shaft, said vertical rod being insertable in the vertical coupling passage, said vertical rod being clamped in the vertical coupling passage using a bolt that is insertable through the perforated lugs, said vertical rod being adjustable in a vertical direction;

a transverse rod attached to the rear end of said connective mounting shaft; and two forearm support bases, each having an insertion sleeve at a bottom thereof, each insertion sleeve being attached to a respective end of said transverse rod;

a joint mount slidably disposed on said connective mounting shank, said joint mount being adjustable in a horizontal direction using a screw that is inserted through the elongated hole and fastened into the joint mount to preclude movement or facilitate variable adjustment to a front or rear according to a length of a user's arms, said joint mount having radial splines respectively formed at outer sides thereof; and two assistive handle bars, each having radial splines at an end thereof which mesh with the radial splines on a respective side of said joint mount, said assistive handle bars being angularly adjustable using a bolt that extends through the respective handle bar and into the joint member to thereby hold said assistive handle bars at a desired angular position.

* * * * *